No. 745,278. PATENTED NOV. 24, 1903.
W. R. HERRING.
APPARATUS FOR MANIPULATING SLIDE VALVES.
APPLICATION FILED NOV. 14, 1902.
NO MODEL. 3 SHEETS—SHEET 1.
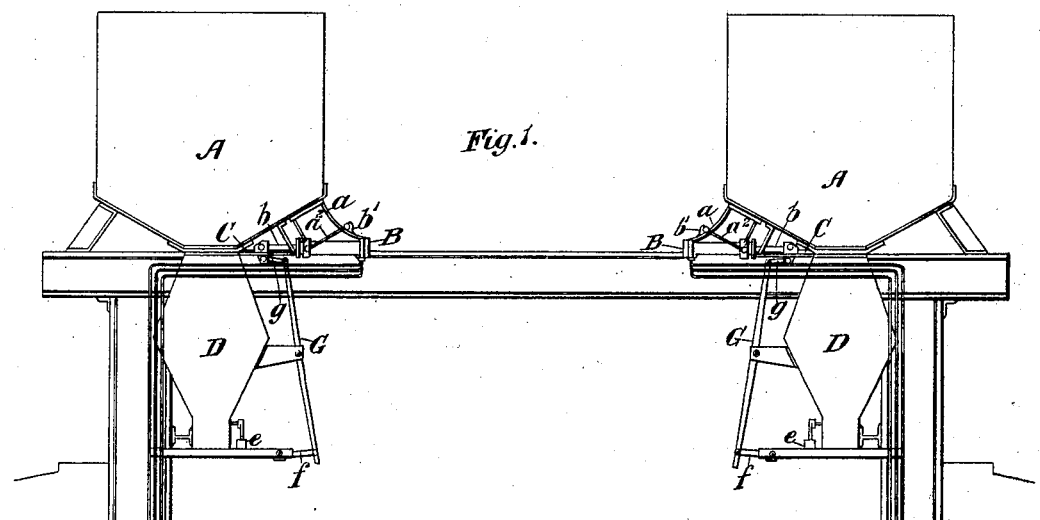
Fig. 1.
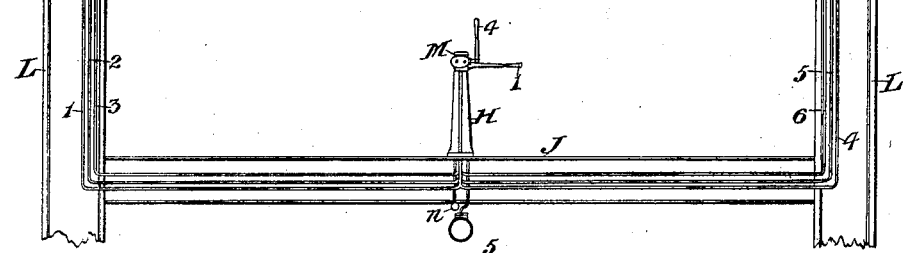
Fig. 2.
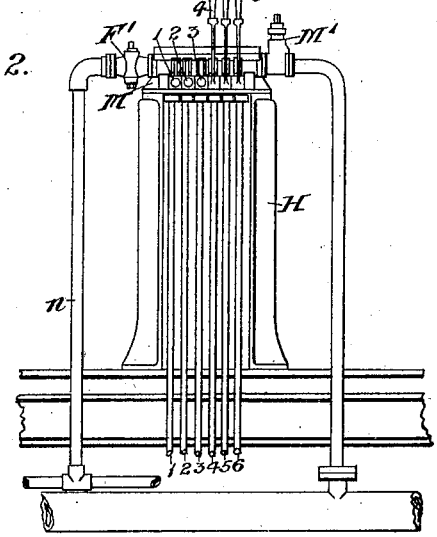

No. 745,278. PATENTED NOV. 24, 1903.
W. R. HERRING.
APPARATUS FOR MANIPULATING SLIDE VALVES.
APPLICATION FILED NOV. 14, 1902.
NO MODEL. 3 SHEETS—SHEET 2.
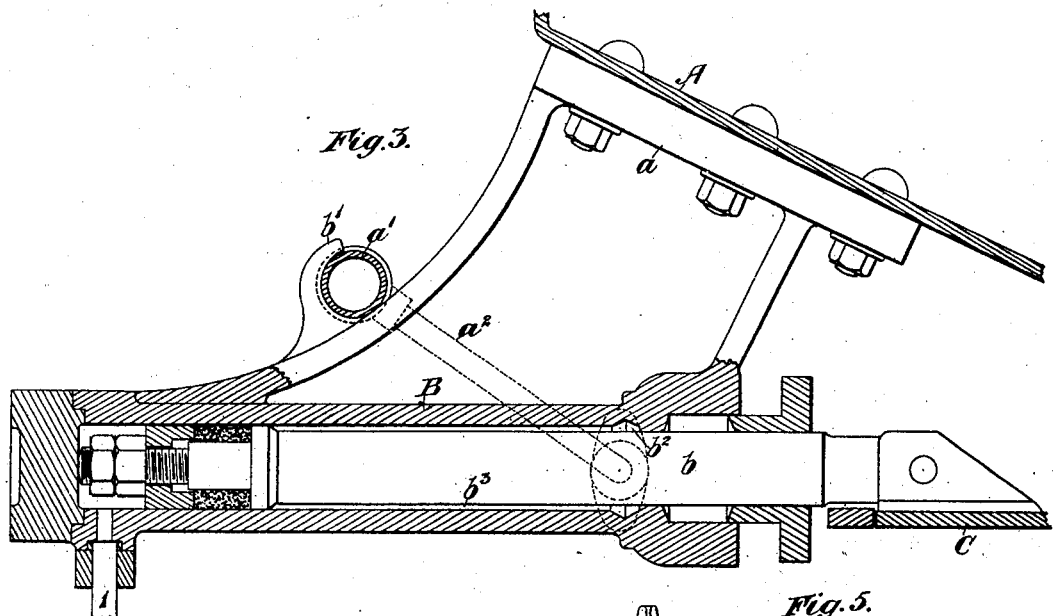
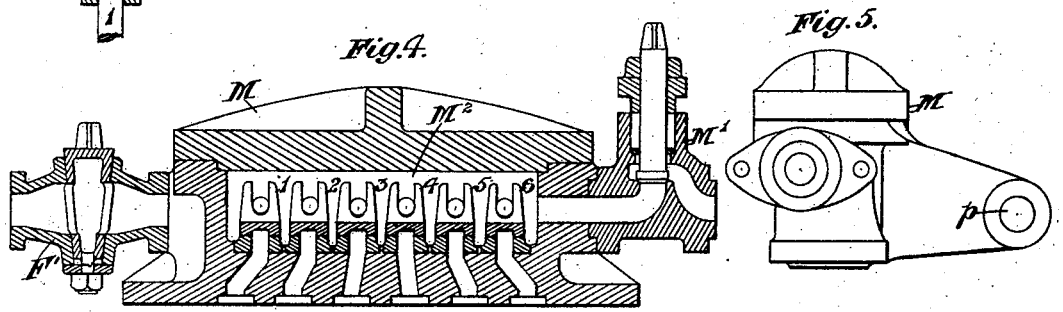
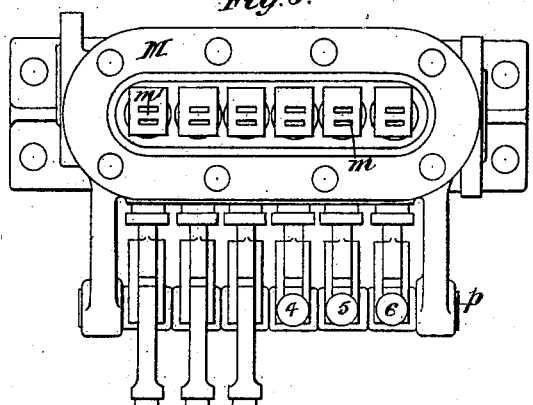
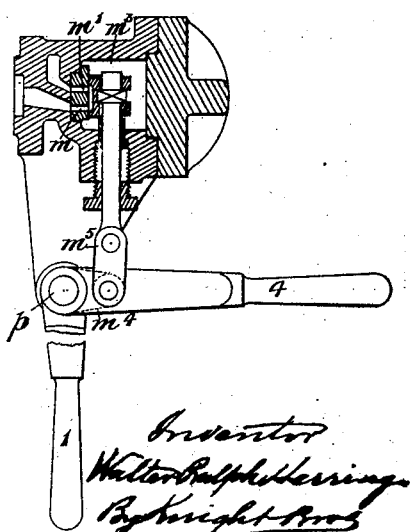
THE NORRIS PETERS CO., PHOTO-LITHO., WASHINGTON, D. C.

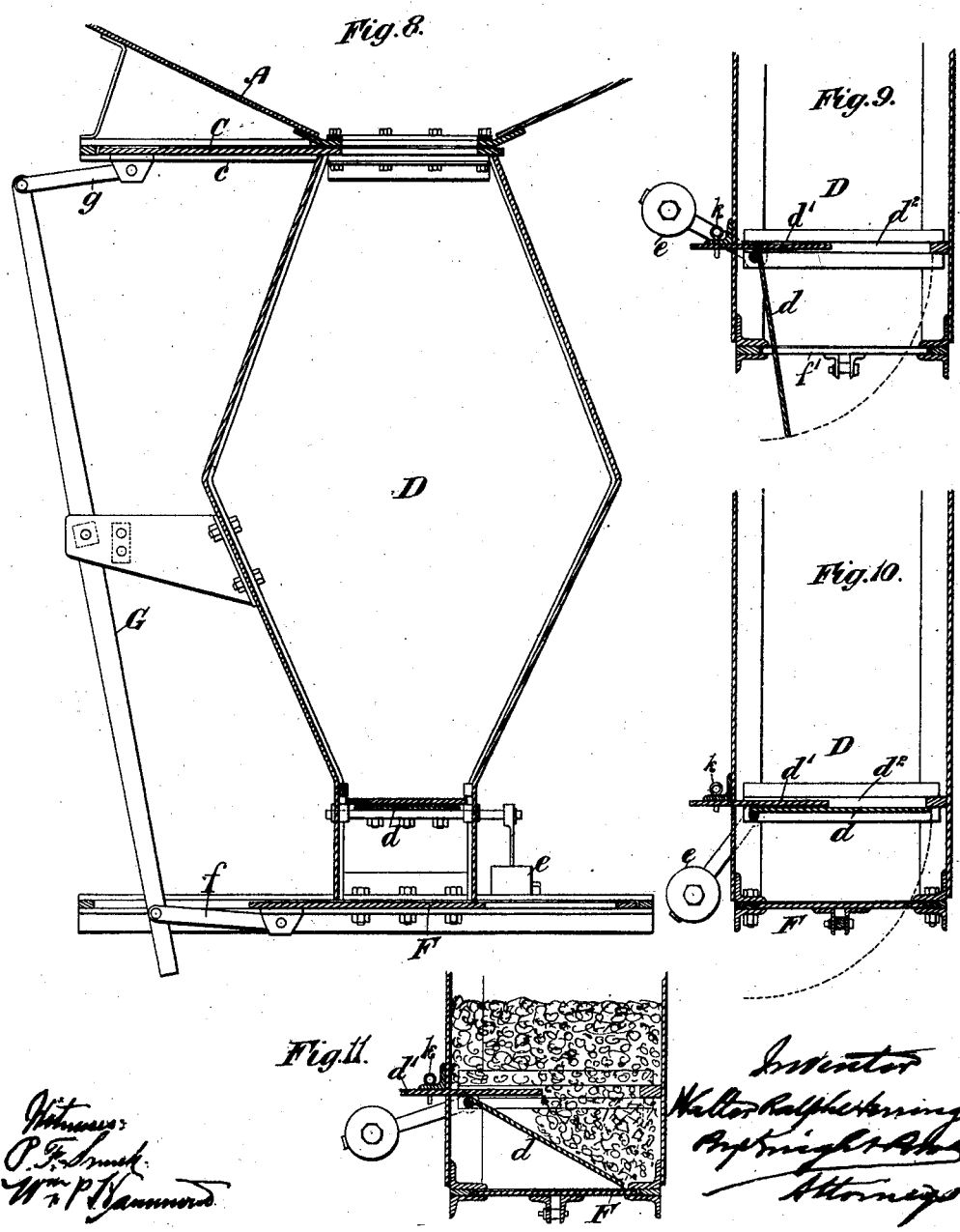

No. 745,278. Patented November 24, 1903.

UNITED STATES PATENT OFFICE.

WALTER RALPH HERRING, OF EDINBURGH, SCOTLAND.

APPARATUS FOR MANIPULATING SLIDE-VALVES.

SPECIFICATION forming part of Letters Patent No. 745,278, dated November 24, 1903.

Application filed November 14, 1902. Serial No. 131,350. (No model.)

*To all whom it may concern:*

Be it known that I, WALTER RALPH HERRING, chief engineer and manager of the Edinburgh and Leith Corporation Gas Commissioners, a subject of the King of the United Kingdom of Great Britain and Ireland, and a resident of New Street Gas Works, Edinburgh, Scotland, have invented Improvements in Apparatus for Manipulating Slide-Valves, of which the following is a specification.

This invention relates to improvements in the method of manipulating the slide-valves of coal-storage hoppers or measuring-chambers in connection with inclined gas-retorts and gas-producers and for other similar purposes; and it consists mainly in the application of hydraulic power to the working of the slides instead of manipulating them by hand-power through compound and other levers, involving, as they do, considerable physical labor and a greater expense in construction.

Figure 1 is an elevation of a double setting of retorts, showing my improvements applied to the base of the coal-storing hoppers and showing the manipulation of the top and bottom slide-valves of the coal-measuring chambers suspended beneath. Fig. 2 is a front elevation, on an enlarged scale, of the hydraulic valves and levers for operating the hydraulic power to double-acting cylinders or rams by which the slides are actuated. Fig. 3 is a longitudinal section of one of the cylinders on an enlarged scale; Figs. 4 to 7, enlarged details of the valves as shown in Fig. 2 and which are mounted on the top of the stand H, Figs. 1 and 2; Fig. 8, a side sectional elevation of the coal-measuring chamber on an enlarged scale to that of Fig. 1. Figs. 9, 10, and 11 are details hereinafter referred to.

Attached to the under side of the hoppers A by the bracket $a$ are the hydraulic cylinders B, the ram $b$ of which is attached to the slide C, which runs between guides $c$, immediately below the coal-hoppers A, from which the measuring-chambers D are suspended, the closing of the slide C simultaneously effecting the opening of the lower slide F through the medium of the pivoted lever G and the links $g$ and $f$, and vice versa, as shown more clearly in the enlarged view, Fig. 8. This figure shows the upper slide open and the lower slide closed. The pressure from the main effects the actuating of the slide in the one direction, while the return of the slide is automatically effected by a pressure from the accumulator, which is constant on the front of the ram. The principle of this arrangement of cylinder consists in the difference in the ram area on either side of the same, the full area of the ram being exposed to the hydraulic pressure on the back side as it moves the slide forward to close the valve when doing its full work, whereas the area on the front side for opening the slide is very considerably less, no greater than the amount of work required to be done in merely pushing the slide into position.

The system of operating in the particular instance shown is where the slide C is required to be constantly open, excepting at such times when it is necessary to close the same to prevent the discharge of the coal from the hopper. A bracket $b'$, Figs. 1 and 3, cast upon the cylinder, supports the pipe $a'$, conveying the constant hydraulic pressure from cylinder to cylinder, the communicating pipe $a^2$ being attached to the front end of the cylinder and discharging into the groove $b^2$, running round the inner circumference of the same, thus leading the water into the annular channel $b^3$ of the cylinder B. The constant hydraulic pressure thus communicated forces the ram $b$ back and pulls back the door or slide C of the hopper.

The actuating-valves may be mounted on the stand H, Figs. 1 and 2, carried on the flooring J, the pipes 1 to 6 being led under the flooring or under the girder carrying the flooring, as shown, and up the sides of the buckstays L.

In order to operate the slides C and F according as it is required to open or close the one or the other, the moving of the hand-lever 1, Fig. 1, in the one direction admits pressure onto the full area of the ram $b$, Fig. 3, and causes the same to move out of the cylinder, so as to close the top slide C, this movement simultaneously opening the lower slide F by means of the pivoted lever G. On moving the hand-lever 1 back again the pressure just admitted is allowed to escape through the valve, as hereinafter detailed, and the ram $b$ is forced in by the constant pressure in the cylinder, which is communicated by the pipe $a^2$ for the purpose of supplying the constant pressure, so as to open the top slide C and simultaneously close the bottom slide F.

The compound hydraulic valve shown in Figs. 2, 4, 5, 6, and 7 shows the arrangement for actuating the ram. The numbers on the valves correspond with similar numbers on the hydraulic cylinders, the valve 1 working the hydraulic cylinder 1, the valve 2 working the hydraulic cylinder 2, and so on up to the valve 6 and cylinder 6.

In starting to work the appliance the spindle-valve M', Fig. 4, of the pressure-supply from the accumulator or other source of pressure is opened, admitting the pressure into the chamber $M^2$ of the valve-chest M, in which are situated the six slide-valves 1 to 6. As the valve mechanism is shown in Figs. 6 and 7 the communication is directly open between the back of the ram for the waste water to be expelled through the valve F', Fig. 4. By moving the lever—say 4, Fig. 7—a given distance—say a distance of two and seven-eighths inches—the port $m$ of the valve, Fig. 7, is open to the chamber $M^2$, Fig. 4, in which the hydraulic pressure constantly remains. The result of this is to communicate the hydraulic pressure through to the back of the ram $b$, Fig. 3, and bring about the expulsion of the same and the closing of the slide at the bottom of the storage-hopper. The reverse motion of the lever 4 immediately allows the constant pressure to come into play and expel the water from the back of the ram to the exhaust-valve F'.

Commencing, say, with No. 1 cylinder, No. 1 valve is opened as required. The hand-lever 1, for example, is now operated, the movement of which in the one direction actuates the ram of No. 1 cylinder through the pressure-pipe 1 of No. 1 valve, the pressure then traversing to the hydraulic ram and closing the slide C, at the same time opening the slide F. The reverse motion of the lever draws back the slide C into the position shown in Fig. 3, allowing the water to return from the cylinder B along the pipe 1 up into the port $m$, thence under the valve and down the adjoining port $m'$ into the passage for the exhaust-water, this water being conveyed, as shown, by the exhaust-pipe $n$ under the stage, Figs. 1 and 2. The levers 1 to 6 move freely on the shaft $p$, the three levers 1 2 3 being connected to the three valve-rods 1 2 3 by the crank $m^4$, Fig. 7, the other three levers 4, 5, and 6 being connected to the valve-rods 4, 5, and 6 by the links $m^5$. The pressure being constant in the chamber $M^2$ and acting upon the back of the valve and the valve-spindle $m^3$ has the effect of constantly keeping this valve in the position shown in Fig. 7.

In order to avoid the necessity of the attendant keeping hold of the valve-lever 4, Fig. 7, until the coal is all discharged from the measuring-chamber, I provide a hinged or balanced flap $d$, Figs. 8, 9, 10, and 11, at the base of the measuring-chamber D, which upon the full stroke of the slide C and F being accomplished falls into the valve-opening $f'$, Fig. 9, by the superincumbent weight of the coal or material resting upon it. The aperture for the coal to pass through may be varied by the plate $d'$, which slides in the groove $d^2$ and which can be fixed in any position by means of the set-pin $k$.

Fig. 9 is a section at right angles to the section Fig. 8, showing the flap $d$ open—that is to say, between the opening in the slide F. Fig. 10 is a similar section, but showing the flap $d$ closed.

Fig. 11 is a similar section to Figs. 9 and 10, but showing the flap $d$ pressed down onto the top of the slide F by the superincumbent weight of coal. As soon as the aperture in the slide F is fully opened the flap $d$ drops into the aperture $f'$, Fig. 9, in the slide F and allows the coal to discharge. Immediately the flap falls the attendant can let go the handle 4, the slide F, which regulates the aperture from the measuring-chamber D, immediately closing against the flap, still leaving the opening unobstructed for the discharge of the material from the measuring-chamber. As soon as the contents of the measuring-chamber are fully discharged the attendant momentarily operates the lever 4. The balance-weight $e$ of the flap $d$, Figs. 9 and 10, swings back above the level of the slide and the reverse stroke takes the lever 4 back to the normal position, closes the port $m$, and leaves things as before. A further advantage of the said flap $d$ is that under any circumstances so long as there is material discharging from the measuring-chamber D it remains open whether pinched by the slide F, operated by the hydraulic ram, or not, and thus acts as a check and prevents the operator varying the charge falling from the chamber other than the exact contents thereof by closing the hydraulic valve before the contents are fully discharged, the falling material upon the flap preventing its return to its normal position. It is obvious that this flap arrangement is also applicable to other hoppers than those in which the slide is operated by hydraulic or like power—that is to say, it is applicable to slides which are operated by hand through levers.

My improvements may be applied to all kinds of discharging-hoppers with or without a measuring-chamber. For example, the discharging-slide, such as C, Fig. 1, may be applied to the discharging-orifice of the hopper from which the coal is discharged directly into the chute below without the measuring-chamber D and lever G, or in other cases discharging the coal into a traversing truck and then tipping the truck into the retort; also, it is to be understood that my improvements are applicable to the discharging or measuring of all kinds of materials into all kinds of receptacles.

In lieu of hydraulic power I may use steam or compressed air.

The device of the counterbalanced flap $d$ and the sliding gate F, controlled thereby, is not in itself new and original with me, but is of special utility and value in coöperation with the self-closing valves by which the operation of the sliding gate is effected and controlled, obviating the necessity of the attendant retaining his hold of the operating-lever while the measuring-chamber is discharging.

The following is what is claimed as new:

1. The combination of the hoppers A, measuring-chambers D, coupled slides C and F, hydraulic cylinders B having piston-rods $b$ connected with the respective slides C, suitable conducting-chutes beneath the measuring-chambers for conveying the charges of coal therefrom to the several retorts; compound valve-chest M, a plurality of exhaust-ports and valves 1 to 6, and valve-rods therein actuating levers 1 to 6, crank-arms $m^4$ and links $m^5$, for the purpose of supplying alternate pressure and exhaust to any one of a number of hydraulic cylinders, as set forth.

2. In mechanism for hydraulic actuation of the slides of coal and other storage hoppers or measuring-chambers, the combination of the compound valve M, having a plurality of pressure and exhaust ports and valves, with the operating-spindles, actuating-levers, and crank $m^4$ and links $m^5$ substantially as described for the purpose of supplying alternate pressure and exhaust to any one of the six or other number of hydraulic cylinders, as set forth.

3. The combination of the hoppers A, measuring-chambers D, coupled slides C and F, hydraulic cylinders B having piston-rods $b$ connected with the respective slides C, suitable conducting-chutes beneath the measuring-chambers for conveying the charges of coal therefrom to the several retorts; compound valve-chest M, a plurality of exhaust-ports and valves 1 to 6, and valve-rods therein actuating levers 1 to 6, crank-arms $m^4$ and links $m^5$, for the purpose of supplying alternate pressure and exhaust to any one of a number of hydraulic cylinders and the counterbalanced flap $d$.

4. The combination of the hoppers A, measuring-chambers D, coupled slides C and F, hydraulic cylinders B having piston-rods $b$ connected with the respective slides C, suitable conducting-chutes beneath the measuring-chambers for conveying the charges of coal therefrom to the several retorts; compound valve-chest M, a plurality of exhaust-ports and valves 1 to 6, and valve-rods therein actuating levers 1 to 6, crank-arms $m^4$ and links $m^5$, for the purpose of supplying alternate pressure and exhaust to any one of a number of hydraulic cylinders and the counterbalanced flap $d$ for controlling the closing of the slide F, as set forth.

WALTER RALPH HERRING.

Witnesses:
 THOMAS ANDREW,
 WILLIAM BLAIR PATERSON.